United States Patent [19]

Nagasaki et al.

[11] Patent Number: 5,160,621
[45] Date of Patent: Nov. 3, 1992

[54] METHOD FOR TREATMENT OF WASTE WATER BY ACTIVATED SLUDGE PROCESS

[75] Inventors: Yoshimi Nagasaki; Takao Hashimoto, both of Kawasaki, Japan; Isao Takemura, Timur, Indonesia; Hiroshi Imai, Kawasaki, Japan; Yasunobu Hirama, Kawasaki, Japan; Tadayoshi Nakajima, Kawasaki, Japan

[73] Assignee: Ajinomoto Co., Inc., Tokyo, Japan

[21] Appl. No.: 304,035

[22] Filed: Jan. 31, 1989

[30] Foreign Application Priority Data

Feb. 1, 1988 [JP] Japan .................. 63-19554

[51] Int. Cl.$^5$ .............................................. C02F 3/12
[52] U.S. Cl. .................................. 210/614; 210/626
[58] Field of Search ............ 210/614, 623, 626, 628, 210/629, 630, 631, 605

[56] References Cited

U.S. PATENT DOCUMENTS

| | | | |
|---|---|---|---|
| 3,725,258 | 4/1973 | Spector et al. | 210/614 |
| 3,897,334 | 7/1975 | Murphy | 210/614 |
| 4,280,910 | 7/1981 | Baumann | 210/614 |
| 4,442,005 | 4/1984 | Breider | 210/614 |
| 4,650,585 | 3/1987 | Hong et al. | 210/614 |

FOREIGN PATENT DOCUMENTS

| | | |
|---|---|---|
| 0073266 | 3/1983 | European Pat. Off. . |
| 2125983 | 12/1972 | Fed. Rep. of Germany . |
| 2348159 | 11/1977 | France . |
| 2422601 | 11/1979 | France . |
| 2112768 | 7/1983 | United Kingdom . |

*Primary Examiner*—Thomas Wyse
*Attorney, Agent, or Firm*—Oblon, Spivak, McClelland, Maier & Neustadt

[57] ABSTRACT

A method for treatment of waste water by an activated sludge process wherein the aeration tank system is composed of three tanks: a first tank, a second tank and a third tank, in which sludge microorganisms adsorb the organic substances in the waste water to be treated and a part of them begin oxidation and decomposition of the substances in the first tank, the organic substances which are adsorbed by the sludge microorganisms are further decomposed by the microorganisms of the second tank, and the sludge microorganisms are activated in the third tank, is disclosed. The aeration amount to the respective tanks is controlled to fall within specified ratios. Further, the pH value in the aeration tank system is controlled to be slightly acidic, and the pH of the tanks increases in order from the first tank to the third tank. The process may also be carried out in a single tank using a three-step batchwise process, where the batches are subject to the aeration and pH requirements.

2 Claims, 1 Drawing Sheet

METHOD FOR TREATMENT OF WASTE WATER BY ACTIVATED SLUDGE PROCESS

BACKGROUND OF THE INVENTION

1. Field of the Invention

The present invention relates to an improvement of a method for treatment of waste water, such as industrial waste water or domestic waste water, by an activated sludge process, where the organic substances contained in the waste water are decomposed with aerobic microorganisms so as to purify the waste water.

2. Description of the Related Art

Various means of purifying waste water with aerobic microorganisms have heretofore been developed and put to practical use, including a so-called activated sludge process. In the conventional apparatus for purification of waste water, the aeration tank where organic substances are decomposed with microorganisms by vigorous aeration is free from partitions therein and the aeration is effected uniformly in the aeration tank. In such a case, the pH value of the waste water to be put into the aeration tank is generally 7 or so, and it has been said that the pH value in the inside of the aeration tank is preferably slightly alkaline, e.g., from 7 to 8 or so.

On the other hand, various methods of using plural aeration tanks for various purposes have been developed. (For example, refer to Japanese Patent Application Laid-Open Nos. 54-77461, 59-39391, 60-19097 and 62-1496 and *J. Ferment. Technol.*, Vol. 63, No. 4, pages 357 to 362, 1985.)

Further, Japanese Patent Application Laid-Open No. 58-98189, which corresponds to GB 2,112,768, illustrates a method of purification of waste water where waste water is fed into an aeration tank system, the organic substances contained in the waste water are decomposed with the microorganisms in the aeration tank and said microorganisms are separated from the drainage as drained from the aeration tank while a part of the thus separated microorganisms is re-circulated to the aeration tank system, which is composed of three tanks. The waste water and microorganisms are fed into the first tank while the amount of aeration in the second tank is made larger than that in the first tank and the amount of aeration in the third tank is made smaller than that in the first tank. In accordance with the method, the aeration tank system is divided into plural tank parts whereby the function of the microorganisms to decompose the organic substances in the plural aeration tanks is differentiated in accordance with the types of adsorption of organic substances, oxidation and decomposition of the adsorbed organic substances and restoration of the microorganisms used, so that the capacity of the microorganisms to be used in the method is enhanced and the property thereof is also improved.

However, the above method has various problems and further reduction of the aeration amount is desired in view of both the operation cost and the equipment cost. Further, a higher concentration of BOD (biological oxygen demand) and further higher load treatment thereof are desired and further improvement of the stability in purification of waste water, though relatively high, is desired.

SUMMARY OF THE INVENTION

The present invention overcomes the above-described problems in the prior art. The present inventors discovered that, in order to overcome the problems, the aeration tank system is composed of three tanks: a first tank, a second tank and a third tank, while the aeration amount in the respective tanks is varied on the basis of the aeration amount in the first tank, and the pH value in the aeration tank system is made acidic rather than alkaline as in the conventional method, whereupon the pH value in the first tank is made lowest and the pH value in the other tanks is made higher in the order of the second tank to the third tank. They have further found that the effect of overcoming the prior art problems may further be accomplished by elevating the BOD load to the sludge and by shortening the restoration time for the sludge. They additionally have found that the three-tank system treatment may be replaced by a batch system treatment where one aeration tank is batchwise used to act as the plural tanks for the plural aeration steps. Accordingly, the present invention has been completed on the basis of these findings.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawing, wherein.

DESCRIPTION OF THE PREFERRED EMBODIMENTS

Figure 1:
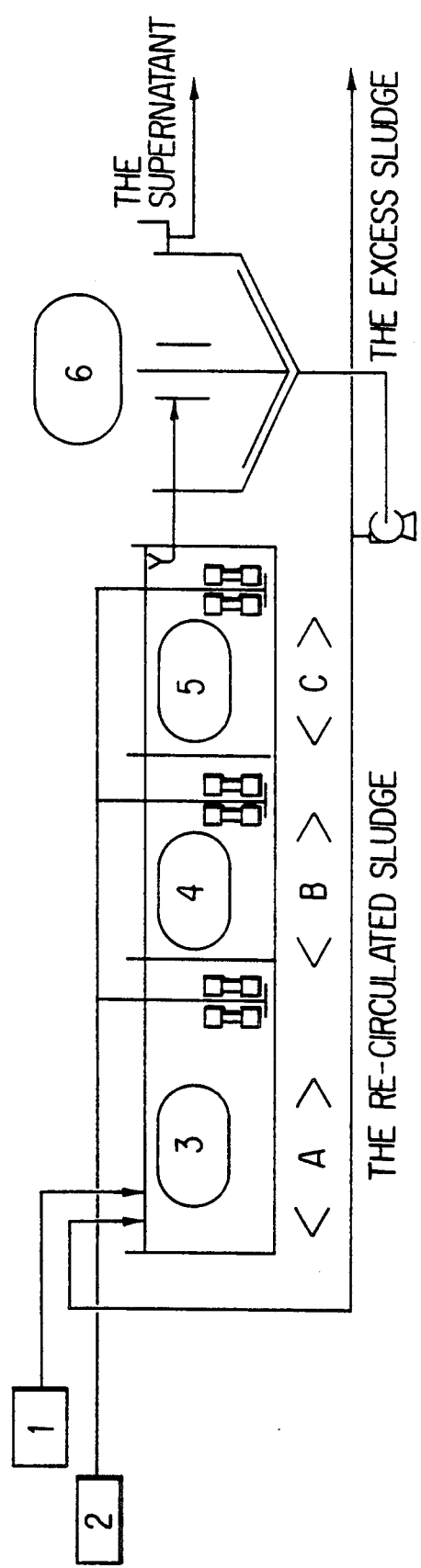
FIG. 1 shows a typical example of an aeration tank system of the present invention. 1 represents waste water, 2 represents air, 3 represents a first tank, 4 represents a second tank, 5 represents a third tank, and 6 represents a flocculation tank. A is where adsorption of organic substances takes place, B is where oxidation and decomposition of the adsorbed organic substances takes place, and C is where restoration of the microorganisms which are used takes place.

In accordance with the method of the present invention, the aeration tank system is in principle composed of three tanks. For this, one tank may be divided with partitions into three tank parts, or three separate tanks may be combined to form a three-tank system. These three tanks have different functions of adsorption of organic substances, oxidation and decomposition of the adsorbed organic substances, and restoration of microorganisms used, separately. In the former case where one tank is divided with partitions into three tank parts, the respective partitions are set vertically from the bottom of the tank so that the waste water to be treated may flow over the respective partitions. Alternatively, partitions vertically standing from the bottom of the tank and partitions having a slit near the bottom of the tank may be provided alternately to form the desired plural tank parts.

In the latter case the separate tanks are combined to form a plural tank system, the upper parts of the respective tanks may be combined with pipes or, alternatively, the upper part and the lower parts of the tanks may be combined alternately with each other. The bottom level of the respective tanks is not required to be the same, but, for example, the tanks may be stepwise arranged so that the waste water being processed may flow over the partitions between the adjacent tanks in order.

Regarding the volume ratio of the respective tanks, it is preferred that the first tank is from 40 to 50% or so of the total volume of the combined three tanks the second tank is from 20 to 25% or so and the third tank is from 20 to 25% or so.

Regarding the residence time of the waste water being processed in the respective tanks, as an example where the BOD concentration of waste water is 3000 mg/liter and the capacity load is 3 kg·BOD/m$^3$·day, the time is from 5 to 6 hours or so in the first tank, it is from 2 to 3 hours or so in the second tank and it is from 2 to 3 hours or so in the third tank.

These three aeration tanks constituting the aeration tank system for use in the present invention may further be partitioned into sub-parts. Further, the aeration tank system of the present invention may be combined with various kinds of other conventional pretreatment tank(s) and post-treatment tank(s).

Among the three tanks, the first tank is provided with a feeding inlet for the waste water to be treated and an introduction inlet for the re-circulated sludge from the sludge separating means. These inlets are necessary for the purpose of displaying the abovementioned various functions in the method of the present invention, and the waste water to be treated and the re-circulated sludge are introduced into the first tank in accordance with the present invention.

On the other hand, as the respective tanks are aeration tanks, these must be provided with an aeration means individually. As the aeration means, any conventional one which is generally used in a conventional aeration apparatus may directly be used. The aeration amount into the said aeration tanks is one characteristic feature in the method of the present invention. Specifically, in accordance with the present invention, the aeration amount is differentiated in three stages in accordance with the respective ratio of aeration tanks, or that is, the ratio of aeration amount in the first tank is defined to be from 0.5 to 0.8 by volume/minute or so to the liquid amount in the said tank, that in the second tank is to be from 0.1 to 0.4 by volume/minute or so to the liquid amount in the said tank and that in the third tank is to be from 0.1 to 0.3 by volume/minute or so to the liquid amount in the said tank. Accordingly, the aeration amount ratio is from 50 to 70% or so in the first tank, from 20 to 30% or so in the second tank, and from 10 to 20% or so in the third tank. Regarding the dissolved oxygen concentration in each aeration tank, the concentration is from 0.5 to 1 ppm or so in the first tank, from 1 to 3 ppm or so in the second tank, and from 0.5 to 1 ppm in the third tank.

Next, in accordance with another embodiment of the present invention, the pH value of the liquid in each of the constituting aeration tanks is all defined to be in the range of from 6.0 to 7.0 under such condition that the liquid in the first tank has the lowest pH value and the liquids in the other second and third tanks have a higher pH value in order. It is preferred that the pH value in the first tank is from 6.0 to 6.5 or so, that in the second tank is from 6.1 to 6.7 or so and that in the third tank is from 6.3 to 7.0 or so.

The pH adjustment in the first tank is effected by adjustment of the pH value of the raw waste water to be fed thereinto, and that in the second and third tanks is effected by adjustment of the aeration amount to be applied thereto. The temperature in the aeration tank system may be the same as that in conventional aeration tanks, or for example, it may be 15° to 43° C. or so, generally 20° to 30° C. or so. The sludge load to the aeration tank system is desired to be adjusted to fall within the range of from 0.5 to 1 kg·BOD/kg·SS·day.

"kg·BOD" indicates the weight unit of BOD. "kg·SS" indicates the weight unit of suspended solid (mainly, microorganisms). Accordingly, "kg·BOD/kg·SS·day" indicates the kg amount of BOD per 1 kg of suspended solid per day.

The sludge load adjustment may be effected by reducing the amount of the sludge to be re-circulated to lower the MLSS (mixed liquor suspended solid) concentration. In place of such adjustment, it is also effective to control the amount of the sludge to be fed in a short cycle of, for example, 1.5 to 4 days or so. The amount of the sludge to be re-circulated into the aeration tank may also be utilized as a standard for adjusting the aeration time in the tank in accordance with the biodecomposable characteristic of the waste water to be treated therein.

The restoration time for sludge is desired to be from 1 to 10 hours or so after arrival of COD (chemical oxygen demand) equilibration. The restoration is effected in the third tank in the case of the aforesaid three-tank aeration system. Apart from this, another aeration tank for activation may be added to the aeration system of the present invention so that the restoration may be effected in the added tank.

The waste water load is 4 kg·BOD/m$^3$·day or less, generally from 2 to 3 kg·BOD/m$^3$·day or so. The concentration thereof may be from 1,000 to 5,000 ppm as BOD. The above-mentioned method is in principle carried out in a three-tank aeration system, but it may also be carried out in one aeration tank under the condition that the tank is batchwise used to act as the first, second and third tanks in order for the respective aeration conditions.

In general, the drainage drained from the aeration tank may directly be subjected to separation of sludge therefrom without any post-treatment such as precipitation of microorganisms. The separation may be effected by conventional methods, for example, by flocculation separation in a flocculation tank or by centrifugal separation in a centrifugal separator, but the use of the former flocculation tank is preferred. A part of the thus separated sludge is re-circulated into the aeration tank, and the residue is treated by firing or by formation of fertilizer.

The kinds of sludge microorganisms for use in the method of the present invention are not specifically limited but conventional sludge microorganisms may directly be used. Such microorganisms are generally aerobic microorganisms, which include yeast such as *Trichosporon cutaneum* CBS 2466 and *Trichosporon fermentum* CBS 2529. In addition, there may be used ordinary activated sludge bacteria which are used conventionally to purify various kinds of waste water or microorganisms separated from such bacteria which are then cultured.

As a matter of course, the waste water to be treated by the method of the present invention is not specifically limited, provided that it may be purified with microorganisms. For example, the method of the present invention may especially advantageously be applied to treatment of domestic waste water as well as other waste water as generated by fermentation of glutamic acid and other various kinds of amino acids.

In summary, in accordance with the method of the present invention, the aeration tank system is composed of three tanks: a first tank, a second tank and a third tank, in which sludge microorganisms adsorb the organic substances in the waste water to be treated and a part of them begin oxidation and decomposition of the said substances in the first tank, the organic substances as adsorbed by the sludge microorganisms are further decomposed by the said microorganisms in the second tank, and the sludge microorganisms are activated in the third tank. The aeration amount to the respective tanks is controlled so that the said functions in the respective tanks may sufficiently be effected therein.

The pH in the first tank is adjusted by addition of an acid such as sulfuric acid. The pH in the second and third tanks is adjusted by aeration, whereby the acidity is changed due to the content of $O_2$ in air.

By controlling the pH value in the aeration tank system to be slightly acidic, the oxygen demand by the sludge microorganisms is inhibited while oxidation of ammonia as well as nitration and denitrogenation are inhibited. In addition, the post-treatment of the purified water after the activated sludge treatment, for example, coagulation precipitation or active carbon adsorption treatment, may thereby be facilitated.

By elevating the sludge load up to 0.5 to 1 kg·BOD/kg·SS·day, the excess sludge formation percentage becomes 1.5 to 2 times higher than that in conventional methods because of the evaluation of the high BOD concentration and load, and the nitrogen in the waste water may be removed by taking the excess sludge out of the treatment system. Moreover, by shortening the sludge restoration time to 1 to 10 hours, the sludge activity may be elevated and the COD removing capacity may thereby be elevated.

EXAMPLES

Example 1

An aeration tank (capacity: about 240 liters) having a width of about 70 cm, a length of about 70 cm and a height of about 70 cm was partitioned with two partition plates each having a width of about 70 cm and a height of about 50 cm into three parts of the first tank part, second tank part and third tank part in a proportion of 3/2/2 in the length direction. About 240 liters of activated sludge microorganisms having an MLSS concentration of about 4,000 mg/liter were put in the tank and aeration was started. An industrial waste water which mainly comprised an amino acid fermentation waste water and had the composition as shown in Table 1 below was fed into the tank in a feeding speed of 10 liters/hour. The aeration was effected in an amount of about 240 liters/minute, in an aeration proportion of about 70% in the first tank part, about 20% in the second tank part and about 10% in the third tank part. The thus aerated and mixed water was introduced into a precipitation tank having a diameter of about 40 cm and a height of about 70 cm, where the activated sludge microorganisms were flocculated and separated and the supernatant was obtained as the treated (purified) water. On the other hand, the activated sludge microorganisms as precipitated on the bottom of the precipitation tank were re-circulated at a flow speed of 10 liters/hour as a re-circulated sludge. In this case, a part of the precipitated sludge microorganisms was taken out as an excess sludge in order that the MLSS concentration in the mixture liquid in the aeration tank could be about 3,500 mg/liter. The mixture liquid in the aeration tank was so adjusted that the pH value in the first tank part is about 6.0, that in the second tank part is about 6.5 and that in the third tank part is about 6.7.

Under these conditions, continuous operation was carried out for about 30 days. For comparison, the same size aeration tank having no partitions was used for the same activated sludge process, where the same amount of the same activated sludge microorganisms was used and the same industrial waste water as adjusted to have a pH value of 7.0 was introduced into the tank at a flow rate of 7 liters/hour. Aeration of 240 liters/minute was effected almost at a constant flow rate, and the thus aerated and mixed liquid from the aeration tank was then subjected to the same solid-liquid separation in the same size precipitation tank. Also in this case, the separated sludge microorganisms were re-circulated while a part of the excess sludge was taken out in order that the MLSS concentration in the mixture liquid in the aeration tank could be about 6,000 mg/liter. Under these conditions, continuous operation was carried out for about 30 days for comparison.

The results obtained are shown in Table 1 below.

TABLE 1

| Item | Unit | Method of the Invention | Conventional Method |
|---|---|---|---|
| Condition | | | |
| Amount of Waste Water Fed | m³/day | 240 | 168 |
| COD Concentration in Waste Water Fed | mg/liter | 1,450 | 1,450 |
| pH of Waste Water Fed | | 3.3 | 7.0 |
| Load | | | |
| COD Capacity Load (COD per 1 m volume of the aeration tank) | kg/m³ · day* | 1.45 (2.9) | 1.0 (2.0) |
| COD Sludge Load (COD per 1 kg of suspended solid) | kg/kg · SS · day | 0.41 (0.82) | 0.17 (0.33) |
| Results | | | |
| pH of Treated Water | | 6.7 | 5.3 |
| COD Concentration of Treated Water | mg/liter | 80 | 120 |
| COD Removing Percentage | % | 94.5 | 91.7 |

Note: The parenthesized value means BOD load.
*kg/m³ · day indicating the units of COD capacity load, is the same as kg · COD/m³ · day.
  kg/kg · SS · day indicating the units of COD sludge load is the same as kg · COD/kg · SS · day.

Example 2

An aeration tank having a length of 40 m, a width of 12 m and a depth of 6 m was partitioned with two partition walls each having a width of 12 m and a height of 5 m into three parts of a first tank part having a length of 18 m, a second tank part having a length of 11 m and a third tank part having a length of 11 m. The thus partitioned aeration tank was used. An industrial waste water mainly comprising an amino acid fermentation waste water was fed into the said aeration tank in an amount shown in Table 2 below, and activated sludge microorganisms were introduced thereinto in an MLSS concentration of 4,000 mg/liter. The aeration was effected in an amount of about 100 m³/minute in the first tank part, in an amount of about 30 m³/minute in the second tank part and in an amount of about 20 m³/minute in the third tank part. The pH value in the first aeration tank part was adjusted to be from 6.0 to 6.5, and the pH value of the raw waste water to be fed was adjusted to be from 3 to 4. On the other hand, the pH value in the third tank part was adjusted to be from 6.3 to 7 and that in the second tank part was adjusted to fall between the pH value in the first tank part and that in the third tank part. Such pH adjustment was effected by proper adjustment of the aeration amount into the second and third tank parts.

The activated sludge microorganism-containing aerated liquid as mixed and treated in the aeration tank was taken out from the third tank part and introduced into a precipitation tank having a length of 30 m, a width of 10 m and a depth of 3.5 m where the activated sludge microorganisms were precipitated and separated from the liquid. Thus the resulting supernatant was obtained from the thus separated liquid as the treated (purified) water. The precipitated sludge microorganisms were continuously re-circulated to the first aeration tank part, after some excess sludge was taken out from the aeration system so that the activated sludge concentration in the mixed liquid in the aeration tank system could be 4,000 mg/liter.

TABLE 2

| Item | Unit | Method of the Invention | Conventional Method |
|---|---|---|---|
| Condition | | | |
| Amount of Waste Water Fed | m³/day | 2,400 | 1,440 |
| COD Concentration in Waste Water Fed | | 1,500 | 1,200 |
| BOD Concentration in Waste Water Fed | mg/liter | 3,000 | 2,400 |
| MLSS Concentration in Aeration Tank | mg/liter | 4,000 | 6,000 |
| pH of Waste Water Fed | | 3.5 | 7.0 |
| Aeration Amount | m³/min | 150 | 250 |
| Load | | | |
| COD Capacity Load | kg/m³ · day | 1.5 | 0.7 |
| BOD Capacity Load | kg/m³ · day | 3.0 | 1.4 |
| COD Sludge Load | kg/kg · SS · day | 0.38 | 0.12 |
| BOD Sludge Load | kg/kg · SS · day | 0.75 | 0.24 |
| Results | | | |
| pH of Treated Water | | 6.7 | 5.3 |
| COD Concentration of Treated Water | | 70 | 130 |
| BOD Concentration of Treated Water | mg/liter | 40 | 70 |
| SS Concentration of Treated Water | mg/liter | 30 | 120 |
| COD Removing Percentage | % | 95 | 89 |
| BOD Removing Percentage | % | 99 | 97 |
| Cost Ratio (Ratio of each Electric Power Unit) | | 48 | 100 |

Example 3

Sludge microorganisms were previously treated by activated sludge process. 5 hours after almost equilibration of the COD concentration of the thus treated microorganisms, 30 liters of the microorganisms having an MLSS concentration of about 4,000 mg/liter were put in a single aeration tank having a capacity of 60 liters. 15 liters of the amino acid fermentation waste shown in Table 3 below were fed into the tank, which was then aerated with air in a flow rate of 18 liters/min. After 2 hours, the COD concentration was measured.

For comparison, the same activated sludge microorganisms were used in the same process, after about 24 hours after arrival of the said COD equilibration The results obtained were shown in Table 3 below.

TABLE 3

| Item | Unit | Method of the Invention | Conventional Method |
|---|---|---|---|
| COD Concentration Waste Water Fed | mg/liter | 1,300 | 1,300 |
| COD Concentration after 2 hours Treatment | mg/liter | 196 | 290 |
| COD Removing Percentage after 2 hours Treatment | % | 55 | 33 |

The results in Table 3 indicate that the sludge microorganisms had an adsorbability of about 170% in 5 hours after arrival of the equilibrated COD concentration, as compared with those treated by activated sludge process for a longer aeration time (by the conventional method).

Example 4

A single cylindrical container having a diameter of 40 cm and a height of 55 cm was used as an aeration tank. 25 liters of an activated sludge having a microorganisms concentration of about 8,000 mg/liter and a pH value of 6.5 were put into the said cylindrical tank, and various kinds of industrial waste waters as shown in Table 4 below were introduced into the tank each in an amount of 25 liters. Aeration was started in an air flow rate of 20 liters/minute for activated sludge process, while the pH value in the tank was kept at about 6.0 for about 5 hours from the beginning of the aeration, about 6.4 from 5 hours to 8 hours, and about 6.7 from 8 hours to 24 hours. The aeration amount was 20 liters/minute for 8 hours from the beginning of the aeration, 10 liters/minute from 8 hours to 12 hours, and 5 liters/minute from 12 hours to 24 hours.

For comparison, the same activated sludge microorganisms were put in the same aeration tank, and the same industrial waste waters were treated by the same activated sludge process under the same condition except that the pH control was free.

The results obtained were shown in Table 4 below.

TABLE 4

| | Method of the Invention | Conventional Method |
|---|---|---|
| Amino Acid Fermentation Waste Water | | |
| COD Concentration in Raw Waste Water Fed (mg/liter) | 1,200 | 1,200 |
| COD Concentration in 24 hour-Aerated Tank (mg/liter) | 60 | 130 |
| COD Removing Percentage (%) | 95 | 89 |
| Microorganisms Oxygen Demand | 1 (standard) | 1.5 |
| pH of Treated Water | 6.6 | 5.2 |
| Fats, Oils and Proteins-Containing Waste Water | | |
| COD Concentration in Raw Waste Water Fed (mg/liter) | 4,900 | 4,900 |
| COD Concentration in 24 hour-Aerated Tank (mg/liter) | 160 | 190 |
| COD Removing Percentage (%) | 92 | 89 |
| Microorganisms Oxygen Demand | 1 (standard) | 1.4 |
| pH of Treated Water | 6.5 | 7.9 |
| Milk Products Preparation Waste Water | | |
| COD Concentration in Raw Waste | 2,250 | 2,250 |

TABLE 4-continued

|  | Method of the Invention | Conventional Method |
|---|---|---|
| Water Fed (mg/liter) | | |
| COD Concentration in 24 hour-Aerated Tank (mg/liter) | 57 | 72 |
| COD Removing Percentage (%) | 98 | 96 |
| pH of Treated Water | 6.6 | 5.3 |
| Coffee Preparation Waste Water | | |
| COD Concentration in Raw Waste Water Fed (mg/liter) | 380 | 380 |
| COD Concentration in 24 hour-Aerated Tank (mg/liter) | 30 | 42 |
| COD Removing Percentage (%) | 92 | 90 |
| pH of Treated Water | 6.7 | 8.1 |
| Boiled Rice Preparation Waste Water | | |
| COD Concentration in Raw Waste Water Fed (mg/liter) | 610 | 610 |
| COD Concentration in 24 hour-Aerated Tank (mg/liter) | 48 | 60 |
| COD Removing Percentage (%) | 98 | 94 |
| pH of Treated Water | 6.6 | 5.8 |
| Chemical Synthesis Waste Water | | |
| COD Concentration in Raw Waste Water Fed (mg/liter) | 9,200 | 9,200 |
| COD Concentration in 24 hour-Aerated Tank (mg/liter) | 340 | 420 |
| COD Removing Percentage (%) | 74 | 67 |
| pH of Treated Water | 6.7 | 8.8 |
| Electrical Instrument Manufacture Waste Water | | |
| COD Concentration in Raw Waste Water Fed (mg/liter) | 35 | 35 |
| COD Concentration in 24 hour-Aerated Tank (mg/liter) | 3 | 10 |
| COD Removing Percentage (%) | 92 | 71 |
| pH of Treated Water | 6.5 | 5.3 |

Example 5

An aeration tank having a length of 33 cm, a width of 12 cm and a height (liquid depth) of 20 cm was used, which was partitioned with two partition plates each having a width of 12 cm and a height of 20 cm into three parts in the length direction. The three parts comprised a first tank part of 50%, a second tank part of 30% and a third tank part of 20% by volume in order. Activated sludge microorganisms having an MLSS concentration of 4,000 mg/liter were put into the said tank, and an industrial waste water consisting mainly of an amino acid fermentation waste water was introduced thereinto in an amount of 8 liters/day, the pH value of the waste water fed being adjusted to be 3.5. The aeration was effected in an amount of about 2 liters/minute, in an aeration proportion of about 70% in the first tank part, about 20% in the second tank part and about 10% in the third tank part. Under these conditions, continuous operation was carried out for 30 days.

For comparison, the same activated sludge and the same industrial waste were fed into the same aeration tank, except that the pH value of the waste water fed was adjusted to be 7.0 and that the pH value in the aeration tank was adjusted to be 6.5 with sulfuric acid, and the same aeration was effected continuously for 30 days.

The results obtained were shown in Table 5 below.

|  | Method of the Invention | Conventional Method |
|---|---|---|
| COD Concentration of Raw Waste | 1,200 | 1,200 |
| Water Fed (mg/liter) | | |
| COD Concentration in Treated Water (mg/liter) | 60 | 90 |
| COD Removing Percentage in Treated Water (%) | 95 | 92.5 |
| pH in Aeration Tank | 6.5 | 6.5 |
| Amount of Sulfuric Acid for pH Adjustment (mg/liter-waste water) | 15 | 170 |

The results in Table 5 indicate that the method of the present invention where the raw waste water to be fed into the aeration tank is previously adjusted to be acidic is better than the conventional method where an acid is added to the aeration tank so as to make the waste water therein acidic, since the amount of the acid to be consumed in the former may be about 1/10 of that to be consumed in the latter.

Summary of Advantages of the Invention

In accordance with the method of the present invention, the aeration amount may be lowered to ½ to ¼ of the aeration amount required in conventional methods, and therefore the equipment cost for aeration as well as the necessary electric energy therefor may be reduced and economized. In addition, BOD concentration of the waste water to be treated may be elevated up to 3000 to 5000 ppm, and the BOD load may be up to 2 to 4 kg·BOD/m³·day. Accordingly, the total equipment for the method may be of a small size. The stability in purification of waste water is high, and stable running may be continued for a long period of time. The water-removing processability of the excess sludge is good, so that the amount of the chemicals to be used in the method may noticeably be reduced as compared with conventional methods. The processability of the purified water by treatment with the activated sludge by the process is highly improved, so that the amount of the chemicals required for the post-treatment of coagulation and precipitation may noticeably be economized and reduced and additionally the processability for adsorption to active carbon is also improved. As opposed to conventional methods, the percentage of formation of the excess sludge is high in the method of the present invention, so that the nitrogen in the waste water may effectively be removed by removing the said sludge. Because of such merits, the equipment cost and the operation cost may noticeably be lowered when the method of the present invention is carried out.

Obviously, numerous modifications and variations of the present invention are possible in light of the above teachings. It is therefore to be understood that within the scope of the appended claims, the invention may be practiced otherwise than as specifically described herein.

what is new and desired to be secured by Letters Patent of the United States is:

1. In a method for treatment of waste water by an activated sludge process where waste water is fed into an aeration tank system so as to decompose organic substances contained in said waste water by microorganisms in said tank system and said microorganisms are separated from the drainage drained from an aeration tank while a part of the separate microorganisms is recalculated to the tank system, the improvement which comprises: carrying out said treatment in an aeration tank system which comprises a first tank, a second tank and a third tank, wherein said waste water containing sludge in an amount of 0.5 to 1 kg·BOD/kg·ss·day and microorganisms are fed into the first tank while the ratio of aeration in the first tank is from 0.5 to 0.8 in terms of volume/minute relative to the liquid amount in said first tank, the dissolved oxygen concentration ranging from 0.5 to 1 ppm in the liquid and the pH ranging from 6.0 to 6.5, the ratio of aeration int he second tank si from 0.1 to 0.4 in terms of volume/minute relative to the liquid amount in said second tank, the dissolved oxygen concentration ranging form 1 to 3 ppm in the liquid of the second tank and the pH ranging from 6.1 to 6.7, and the ratio of aeration in the third tank is from 0.1 to 0.3 in terms of volume/minute relative to the liquid amount in the third tank, the dissolved oxygen concentration ranging from 0.5 to 1 ppm in the liquid of the third tank and the pH ranging from 6.3 to 7.0.

2. A method for treatment of waste water as claimed in claim 1, in which the pH adjustment in the first tank is effected by adjusting the pH value of the waste water to be fed thereto and that in the second and third tanks is effected by adjustment of the aeration amount to be applied thereto.

* * * * *

UNITED STATES PATENT AND TRADEMARK OFFICE
CERTIFICATE OF CORRECTION

PATENT NO. : 5,160,621
DATED : November 3, 1992
INVENTOR(S) : NAGASAKI ET AL

It is certified that error appears in the above-identified patent and that said Letters Patent is hereby corrected as shown below:

<u>Col.</u>  <u>Line</u>

2,    68,  after "tanks" insert --,--;

3,    20,  delete "abovementioned" and insert --above-mentioned--;

10,   60,  delete "what" and insert --What--;

11,    1,  delete "recalculated" and insert --recirculated--;

11,   11,  delete "int he" and insert --in the--; same line, delete "si" and insert --is--;

11,   14,  Claim 1, delete "form" and insert --from--.

Signed and Sealed this

Sixteenth Day of November, 1993

Attest:

BRUCE LEHMAN

Attesting Officer      Commissioner of Patents and Trademarks